(12) United States Patent
Schier

(10) Patent No.: US 7,117,527 B1
(45) Date of Patent: Oct. 3, 2006

(54) DEVICE, SYSTEM, AND METHOD FOR CAPTURING EMAIL BORNE VIRUSES

(75) Inventor: John E Schier, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 472 days.

(21) Appl. No.: 09/752,046

(22) Filed: Dec. 29, 2000

(51) Int. Cl.
H04L 9/32 (2006.01)
G06F 15/16 (2006.01)
G06F 7/04 (2006.01)

(52) U.S. Cl. ............... 726/5; 726/16; 726/22; 709/206

(58) Field of Classification Search ........ 713/200–202, 713/150, 268, 175, 176; 714/38; 705/56, 705/50; 709/204, 206
See application file for complete search history.

(56) References Cited

U.S. PATENT DOCUMENTS

| | | | | |
|---|---|---|---|---|
| 4,975,950 A * | 12/1990 | Lentz | ................ | 713/200 |
| 5,020,105 A * | 5/1991 | Rosen et al. | ................ | 705/66 |
| 5,121,345 A * | 6/1992 | Lentz | ................ | 713/188 |
| 5,272,754 A * | 12/1993 | Boerbert | ................ | 713/159 |
| 5,485,575 A | 1/1996 | Chess et al. | ................ | 395/183.14 |
| 5,974,549 A * | 10/1999 | Golan | ................ | 713/200 |
| 6,061,794 A * | 5/2000 | Angelo et al. | ................ | 713/200 |
| 6,069,616 A * | 5/2000 | Rozum, Jr. | ................ | 345/168 |
| 6,075,860 A * | 6/2000 | Ketcham | ................ | 713/159 |
| 6,087,955 A * | 7/2000 | Gray | ................ | 340/5.74 |
| 6,112,305 A * | 8/2000 | Dancs et al. | ................ | 713/156 |
| H1944 H * | 2/2001 | Cheswick et al. | ................ | 713/201 |
| 6,266,692 B1 | 7/2001 | Greenstein | ................ | 709/206 |
| 6,268,788 B1 * | 7/2001 | Gray | ................ | 340/5.2 |
| 6,275,937 B1 | 8/2001 | Hailpern et al. | ................ | 713/188 |
| 6,321,267 B1 | 11/2001 | Donaldson | ................ | 709/229 |
| 6,327,579 B1 | 12/2001 | Crawford | ................ | 705/400 |
| 6,367,017 B1 * | 4/2002 | Gray | ................ | 713/200 |
| 6,442,692 B1 * | 8/2002 | Zilberman | ................ | 713/184 |
| 6,609,199 B1 * | 8/2003 | DeTreville | ................ | 713/172 |

* cited by examiner

Primary Examiner—Christopher Revak
(74) Attorney, Agent, or Firm—Baker Botts L.L.P.

(57) ABSTRACT

A device, system, and method for capturing email borne viruses are disclosed. In one form an input device such as a keyboard, coupled to a system includes an email function button and a identification key uniquely identifying the keyboard. The keyboard's identification key may be used with a system's email software program to authenticate the origin of initiation of an email communication.

22 Claims, 3 Drawing Sheets

DEVICE, SYSTEM, AND METHOD FOR CAPTURING EMAIL BORNE VIRUSES

TECHNICAL FIELD OF THE INVENTION

This invention relates in general to electronic communication, and more particularly to a device, system, and method for capturing email borne viruses.

BACKGROUND OF THE INVENTION

Electronic communication is often transmitted in the form of emails to recipients via various networks and devices. Computer systems are coupled to one or more networks such as the Internet or an Intranet and receive emails on a periodic basis. Wireless devices such as personal digital assistance (PDAs) and wireless phones may also receive emails via wireless networks which may be coupled to the Internet or an Intranet.

Such devices receiving emails may be vulnerable to email borne viruses that may be received by users. For example, a user may open an email having the virus allowing the virus to damage the user's system, device, files, etc. Current defenses against such virus's include system administrators warning users of the virus (i.e. via email, voicemail, etc.) with hopes that a user does not open the email having the virus. Other solutions include rapidly developing and distributing an anti-virus program to detect the virus open receipt.

SUMMARY OF THE INVENTION

In accordance with the teachings of the present invention, a device, system, and method for capturing email borne viruses are disclosed. According to one aspect of the invention, an input device for use with a system operable to process an electronic communication is disclosed. The input device includes a function button operably associated with selecting a type of electronic communication such as an email function and an identification key operable to identify the input device in response to a user selecting the function button.

According to another aspect of the invention, a method for providing an identifier for processing an electronic communication is disclosed. The method includes receiving a request via an input device to process an email and determining an identification key operable to identify the input device. The method further includes processing the email using the requesting process upon validating the identification key.

According to a further aspect of the invention, a system operably associated with processing an electronic communication is disclosed. The system includes a processor operable to process electronic communication such as an email and memory operably coupled to the processor. The system further includes an input device operably coupled to the processor. The processor is operable to validate a user request via the input device to process an email.

According to another aspect of the invention, a method for processing an electronic communication using a system is disclosed. The method includes determining an input device operably coupled to the system and determining an identification key operably associated with the input device. The method further includes processing an electronic communication upon receiving a valid request from the input device to process the electronic communication.

According to a further aspect of the invention, an input device for use with a system operable to process an electronic communication such as email is disclosed. The device includes means for receiving a request via an input device to process an email and means for determining an identification key operable to identify the input device. The device further includes means for processing the email using the requesting process upon validating the identification key.

According to another aspect of the invention, a medium including encoded logic for processing electronic communications is disclosed. The medium includes the logic operable to determine an input device operably coupled to the system and to determine an identification key operably associated with the input device. The medium further includes the logic operable to process an email upon receiving a valid request from the input device to process the email.

Technical advantages of certain embodiments of the invention include providing an input device operable to request processing an electronic communication such as an email. The input device, such as a keyboard, operably coupled to a system includes an electronic communication function button and a identification key uniquely identifying the keyboard. The keyboard's identification key may be used with a system's electronic communication software program to authenticate the origin of initiation of an electronic communication. As such, a user must interact with the keyboard to request processing an electronic communication and identification key for the keyboard may be provided to the electronic communication software program thereby allowing the program to validate the origin requesting processing of the electronic communication. In this manner, electronic communications having viruses that may be received from a third party will require a user input to initiate processing (i.e. forwarding, replying, sending, etc.) thereby reducing auto-sending electronic communications having viruses to addresses listed within a user's electronic communication account.

Another technical advantage of certain embodiments of the invention includes a system operable to employ an email program. In one form, the system employing the email program may receive an input via user interface and verify the origin of the request prior to processing the email. Such verification may include accessing an operating system and/or hardware component associated with the system to determine if a user initiated the request via an input device to process the email. In one embodiment, an identification key associated with an input device may be provided to verify initiation. In another embodiment, an input device port may be accessed by the system, an operating system, and/or software program to determine if the request is initiated by the input device. As such, verification of a request to process an email may be obtained prior to processing emails.

DETAILED DESCRIPTION OF THE INVENTION

Figure 1:
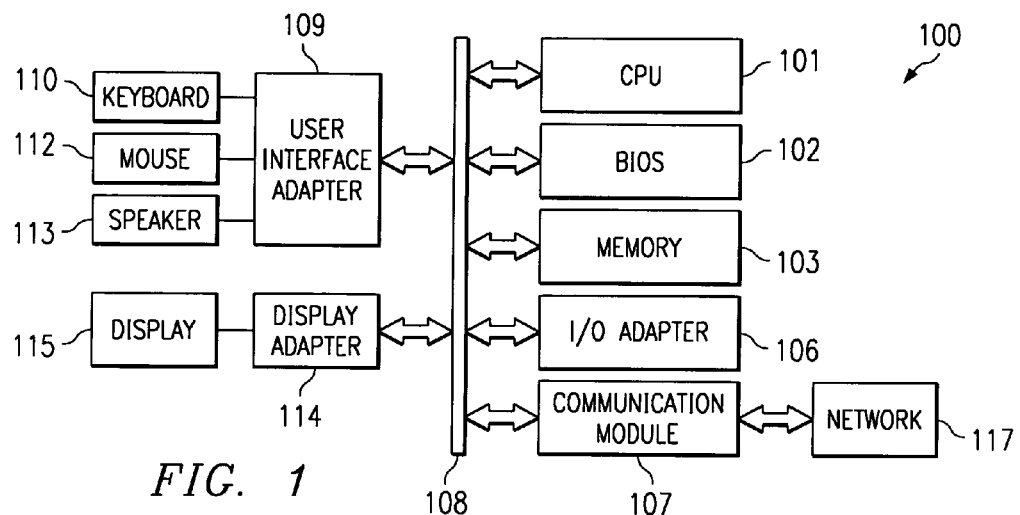
FIG. 1 illustrates one embodiment of a system operable to use an electronic communication software program.

FIG. 1 illustrates a system operable to use an electronic communication software program such as an email software application. However, the system may be used with a wide variety of electronic communication formats and is not limited to only email. The system may include a computer system, a personal digital assistant (PDA), a wireless handheld device, a wireless telephone, a portable computer, a server, or other devices operable to interact with a network such as a LAN, WAN, an Intranet, the Internet, a wireless network, or other networks.

A system, indicated generally at 100, includes a central processing unit (CPU) 101 connected via at least one bus 108 to a basic input output system (BIOS) firmware 102, and memory, such as RAM, ROM, EEPROM, and any other memory devices, collectively designated by reference numeral 103. System 100 further includes an input/output adapter 106 for connecting peripheral devices such as SCSI drives, RAID drives, and a display adapter 114 for connecting a display device 115 such as a Flat Panel Display (FPD) or a Cathode Ray Tube (CRT). A user interface adapter 109 is provided having connection ports for connecting a keyboard 110, a mouse 112, a speaker 111 and/or other user interface devices such as game controllers, touch pads, etc. System 100 also includes a communication module 107 for connecting system 100 to an information network 117. For example, communication module 107 may include an ethernet card, a cable modem, a digital subscriber line (DSL) modem, a wireless modem, an analog modem, or other modems and/or network interface cards operable to provide a system access to a network such as a LAN, WAN, the Internet, an Intranet, a wireless network, etc.

During use, system 100 may employ an email software program for processing electronic communication such as emails or other software programs associated with a wide variety of electronic communications. The email software program may be operable to communicate emails for a user of system 100 and may receive and transmit emails via networks such as the Internet, an Intranet, a wireless network or other networks operable to communicate emails. For example, the email software program may be operable to store received emails within an in box, provide folders for storing and saving emails, provide one or more address books having email addresses, provide communication function buttons which may be operable to allow a user to edit, draft, forward, send, delete, etc. emails. The email software program may further be operable to receive emails which may include attachments and may also be operable to attach such attachments to an email communication for sending to a third party.

In one embodiment, system 100 may receive a request from a user via a user interface to process an email. For example, system 100 may receive an input via keyboard 110 to forward an email. System 100 may validate that a user interacted with keyboard 110 by accessing an input device port (not expressly shown) associated with user interface adapter 109 and communication port coupling keyboard 110 to system 100. As such, through system 100 verifying the origin of the request to forward the email, an email may not be automatically forwarded to another system and/or user. For example, a user may select a send function button operably associated with keyboard 110 for sending an email to a third party. As such, system 100 may detect a request by a user selecting the function button. Similarly, system 100 may receive an identification key operable to identify keyboard 110. As such, system 100 may verify the send function and the identification key prior to processing the email. In this manner, an email communicated to system 100 may not be automatically forwarded to a third party without a user initiating forwarding of the communication to a third party via a user input device operably coupled to system 100.

Figure 2:
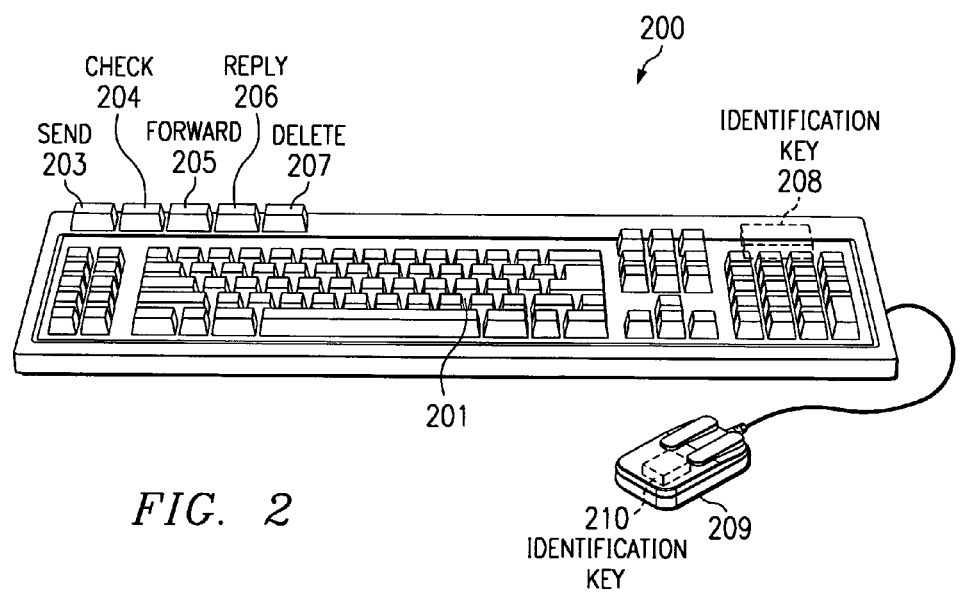
FIG. 2 illustrates one embodiment of a keyboard and mouse having selectable electronic communication function buttons.

FIG. 2 illustrates a keyboard having selectable electronic communication function buttons. A keyboard, illustrated generally at 200, includes a set of keys 201 such as a QWERTY keyboard, a keypad operable to be used with a wireless device, or other input keys operable to provide entry of alphanumeric and/or symbolic text. Keyboard 200 further includes an array of electronic communication function buttons including a send email button 203, a check email button 204, a forward email button 205, a reply email button 206, and a delete email button 207. Keyboard 200 further includes keyboard identification key 208 which may include a single value operably associated with keyboard 200 and stored within memory (not expressly shown) associated with keyboard 200. Keyboard identification key 208 may be a variable value operable to be programmed and/or reprogrammed to uniquely identify keyboard 200. Keyboard 200 may also be coupled to a mouse 209 which may be directly coupled to keyboard 200 or may be coupled to a computer system such as system 100 of FIG. 1. Mouse 209 further includes a mouse identification 210 similar to keyboard identification key 208 and operable to uniquely identify mouse 209.

During use, a user may select one of the plurality of email function buttons 203, 204, 205, 206 or 207 for processing email for a user accessing an email software program. For example, a user must select send button 204 to initiate sending an email to a third party. Keyboard 200 may provide a request to the system (not expressly shown) requesting a send function. Keyboard 200 may also provide keyboard identification key 208 to uniquely identify keyboard 200 as being the requesting input device. As such, the system and/or email software program may validate the request prior to processing the email using a send function. In this manner, undesirable autoforwarding or sending of emails which may be received by a user of a system operably coupled to keyboard 200 may be reduced thereby reducing proliferation of email viruses to third parties associated with a user, a system, and/or an email software program.

In one embodiment, a user may request processing an email using mouse 209. For example, an email software program having selectable function buttons within a graphical user interface for processing emails may be accessed using mouse 209. The email program may be a system or network native application and may include drop down menus, selectable icons and/or soft keys having software encoded functionality for manipulating, editing, authoring, and/or processing emails. For example, a user may select a forward function using mouse 209 and mouse 209 may provide mouse identification key 210 operable to verify the input originated from mouse 209. As such, mouse identification key 210 may be communicated to the email software program after a user selects the function within the email software program to verify the origin of the initiating input device.

In one embodiment, during initialization and/or installation of an email software program and/or a new keyboard or mouse, an identification key may be created for keyboard 200 and/or mouse 209. For example, an email software program and/or system may request the user to create an identification key through selecting one or more keys operably associated with an input device. As such, the identification key may be associated with the input device and may be updated upon initialization and/or installation of the software program.

In another embodiment, the system and/or email software program may randomly create a device identification key for an input device operably coupled to the system which may be used for processing emails. The device identification key may be created during initialization and/or installation of the program and may be communicated to each input device and stored within a memory operably associated with each input device. As such, a different identification key may be used on a random basis, thereby reducing the ability of a third party to identify an input device's identification key. In a similar manner, keyboard 200, the system and/or software program may be programmed to use various keys to request processing of emails. For example, during initialization of an email software program, a user may be asked to enter a series of keys to be associated with processing an email. The user may select a combination of "Alt-7" to be associated with forwarding an email. In this manner, a different series of keys may be provided for email process functions. Additionally, a user may be required to enter a valid password to request processing an email thereby adding an additional layer of security for processing emails.

Figure 3:
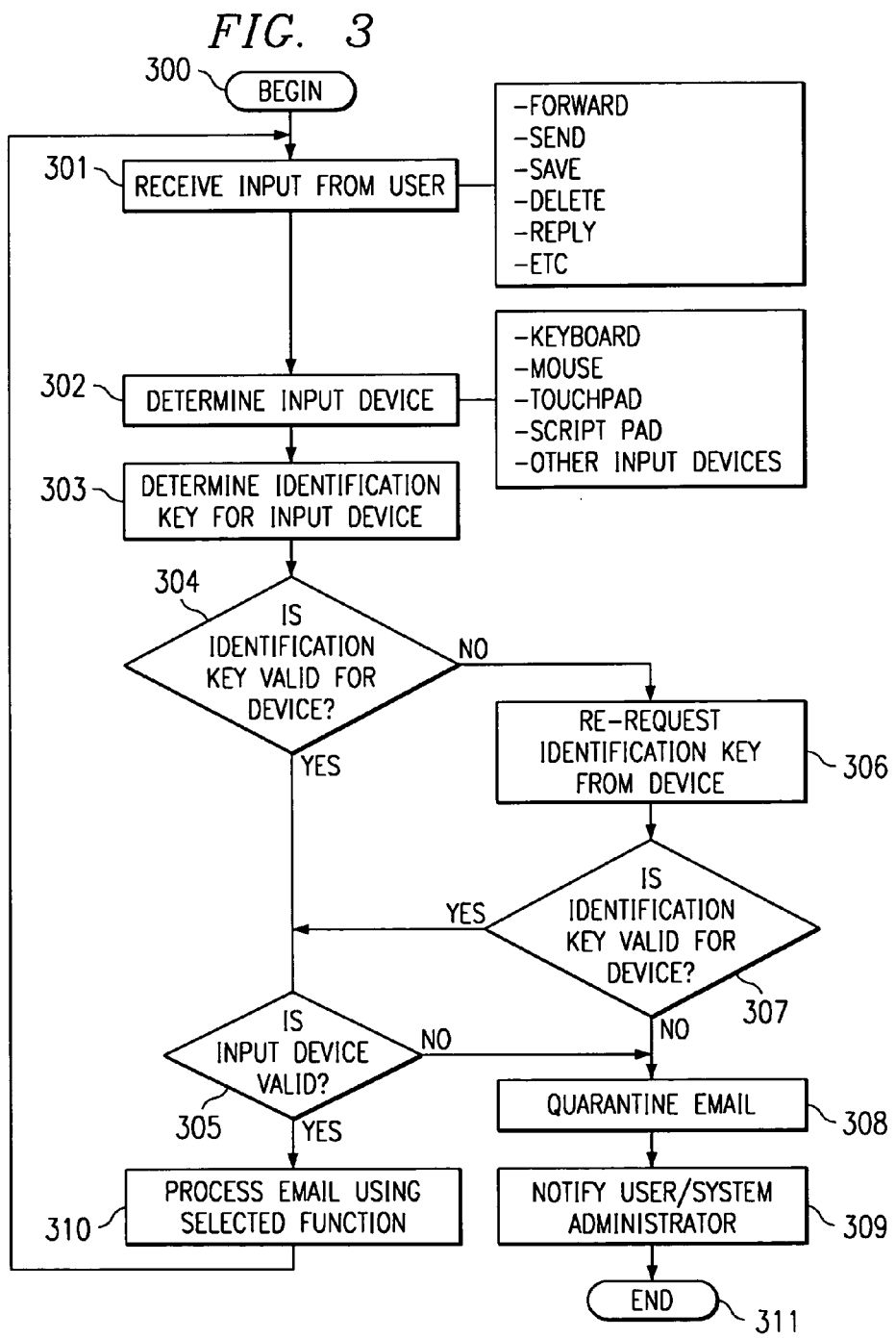
FIG. 3 illustrates one embodiment of a flow diagram of a method for processing an electronic communication using an input device having an identification key according to one aspect of the present invention.

FIG. 3 illustrates a flow diagram of a method for processing an electronic communication using an input device having an identification key. The method begins at step 300. At step 301, the method receives an input from a user for processing an electronic communication such as an email. For example, the input may be a send request, a forward request, a delete request, an edit request, a reply request, etc. Upon receiving the input, the method proceeds to step 302 where the method determines the input device requesting the process. For example, the method may determine the input originated from a scribe pad operably coupled to a PDA. The method proceeds to step 303 where the method determines an identification key operable to identify the input device requesting processing of the email. For example, the identification key may be operably associated with a keyboard, a mouse, a touchpad, a pointing device, etc. and may be stored within a memory operably associated with an input device or within memory operably coupled to a system.

Upon determining the identification key, the method proceeds to step 304 where the method determines if the identification key is valid. If the identification key is not valid, the method proceeds to step 306 where the method re-requests the identification key and to step 307 where the identification key is revalidated. If the identification key is valid, the method proceeds to step 305 where the method determines if the request originated from an input device. If the request did not originate from an input device, the method proceeds to step 308 where the method quarantines the email and to step 309 where the method sends a notice to a system administrator and/or user that an email potentially containing a virus has been detected. The method then proceeds to step 311 where the method ends.

If at step 304 the method determines that the identification key is valid, the method proceeds to step 305 where the method determines if the input originated from an input device. If the input did originate from an input device, the method proceeds to step 310 where the method processes the email using the requested process. For example, the method may send an email, forward an email, save an email, delete an email, etc. The method then proceeds to step 301 where the method receives an input from a user.

Figure 4:
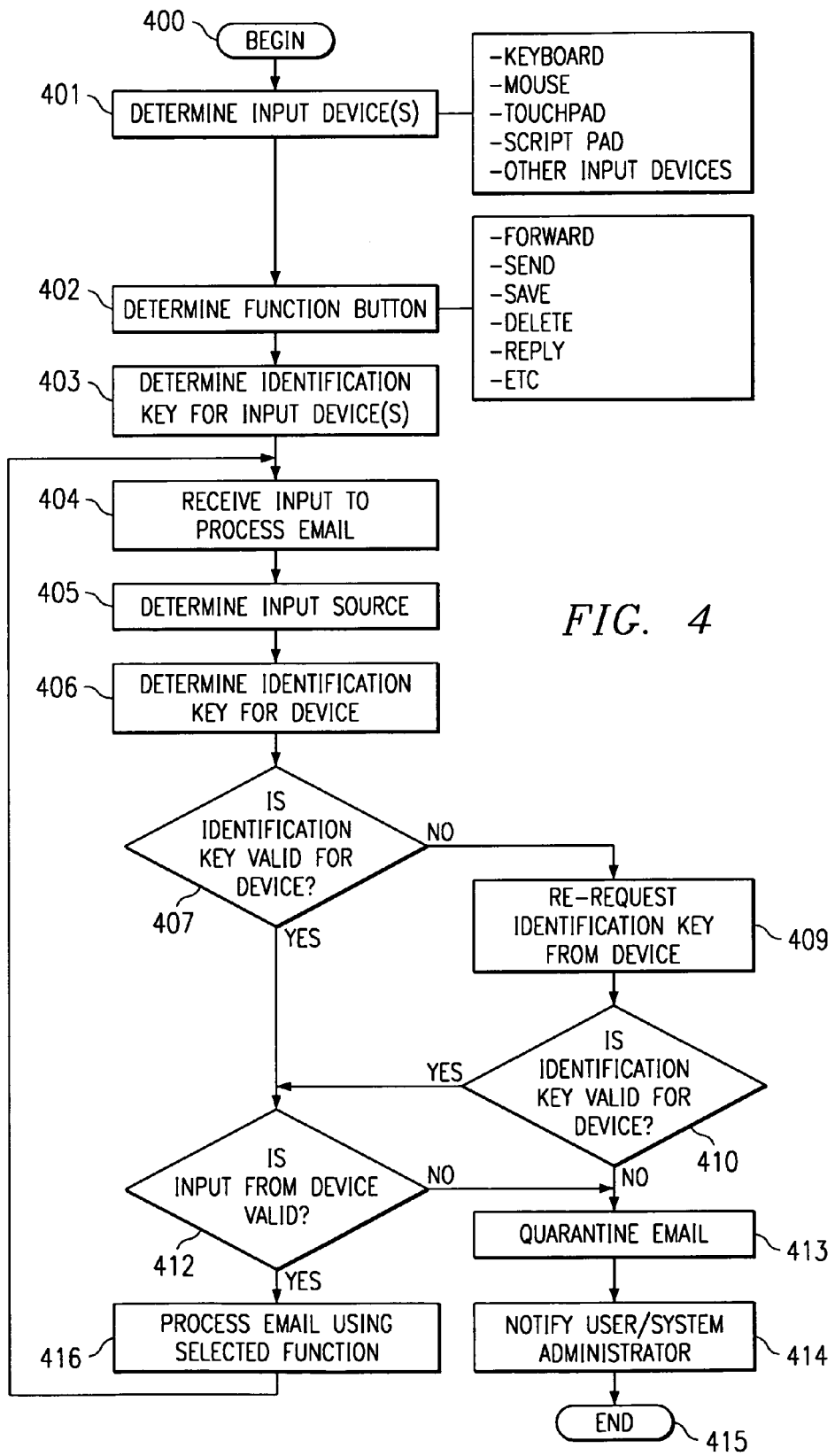
FIG. 4 illustrates one embodiment of a flow diagram of a method for processing electronic communications using an electronic communication software application.

FIG. 4 illustrates a flow diagram of a method for processing electronic communications using an electronic communication software program. The method begins at step 400 and may be used in association with electronic communication software program such as an email software program that may be accessed via system, an Intranet and/or the Internet operable to provide an email software program. At step 401, the method determines which input devices are operable to be used by the email software program. For example, the system may include one or more input devices such as a keyboard, mouse, touchpad, script pad, etc. coupled to a user interface for providing an input to a system using the email software program. Upon determining a valid input device, the method proceeds to step 402 where the method determines which function buttons for an input device are valid for processing emails. For example, a keyboard may include a "send" function button for requesting a send function associated with the email software program. As such, one or more valid input devices may include function buttons operably associated with processing emails and may include a check mail function button, a send function button, a delete function button, a save function button, a forward function button, etc.

The method then proceeds to step 403 where the method determines a valid identification key for each input device operable to request a process. The identification key(s) may be stored in a database accessible by the program and in one embodiment the method may create an identification key for an input device operably coupled to the system using the email software program. In another embodiment, the method may query one or more ports having one or more input devices operably coupled to the system and obtain an input identification key for each device operably coupled to the system.

The method then proceeds to step 404 where the method receives a request to process an email. For example, the email software program may receive a request from an input device, from an operating system operably associated with a system employing the email program, or from a processor operably coupled to the system employing the software program. Upon receiving the request, the method proceeds to step 405 where the method determines a source requesting processing of the email. For example, a user may select a forward function button operably associated with a keyboard coupled to a system employing the email software program. As such, the method proceeds to step 406 where the method determines an identification key provided by the input device. For example, the method may access a memory location having the identification key provided by the input device.

Upon determining the identification key, the method proceeds to step 407 where the method determines if the identification key is valid. For example, the identification key determined for an input device determined at step 403 is compared to the identification key of the requesting input device. If the identification key is not valid, the method proceeds to step 409 where the method re-requests the input device's identification key and to step 410 where the method revalidates the identification key. If the identification key is not valid, the method proceeds to step 413 where the method quarantines the email and to step 414 where the method notifies the system administrator and/or system user of the potential virus-containing email. The method then proceeds to step 615 where the method ends.

If at step 408, the method determines that the identification key is valid, the method proceeds to step 412, where the method determines if the request for processing was initiated by a user selecting a function button operably associated with an input device coupled to the system. If the method determines that a user initiated the request, the method proceeds to step 416, where the method processes the email. For example, the method may forward an email, send an email, delete an email, access a group of email addresses, or other email functions operably associated with email software programs. In one embodiment, the method may include appending the email to include the identification key prior to sending the email to a third party. In this manner, if an email having a virus is forwarded to a third party, a system, a system administrator, a user, etc. may be able to access the email and decrypt the identification key to determine the origin of the email. Upon processing the email, the method then proceeds to step 404.

If at step 412 the method determines that a user did not initiate the request to process the email, the method proceeds to step 413 where the method quarantines the email and to step 414 where the method notifies a user and/or system administrator of the potential virus-containing email. The method then proceeds to step 615 where the method ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for providing an identifier for processing an electronic communication comprising:
   receiving a request via an input device to process the electronic communication, the requested process comprising at least one of a selected forward request, a send request, a save request, a delete request, a reply request and a check request;
   determining if the request originated from the input device;
   processing the request if the request originated at the input device;
   determining an identification key associated with the input device, the identification key uniquely identifying the input device; and
   processing the electronic communication using the requested process upon validating the identification key.

2. The method of claim 1, further comprising:
   accessing a portion of memory to determine the identification key;
   receiving the identification key from the input device; and
   comparing the received identification key to a the stored identification key to determine if the input is valid.

3. The method of claim 1, further comprising:
   receiving the request via a port operably associated with the input device;
   receiving the identification key from the input device; and
   verifying the request and the identification key.

4. The method of claim 1, further comprising:
   quarantining the electronic communication if the identification key is not valid; and
   notifying a user of the quarantined electronic communication.

5. The method of claim 1, further comprising:
   storing the identification key within a memory associated with the input device.

6. The method of claim 1, further comprising:
   determining an electronic communication process associated with the input device; and
   associating the request with one or more buttons associated with the input device.

7. The method of claim 6, further comprising receiving an input from a user to select the one or more function buttons.

8. The method of claim 1, further comprising displaying a function button within a user interface associated with the input device.

9. The method of claim 1, further comprising associating an encrypted device identifier within the electronic communication upon processing the electronic communication.

10. A method for processing an electronic communication in the form of email using a system comprising:
    determining an input device operably coupled to the system;
    determining if a valid request originated from the input device;
    processing the valid request if the input originated at the input device determining an identification key associated with the input device, the identification key uniquely identifying the input device; and
    processing an email upon receiving the valid request from the input device to either forward, send, save, delete, reply, or check the email.

11. The method of claim 10, further comprising:
    determining a function button operably associated with the input device; and
    receiving an input to process the email via a user selecting the function button.

12. The method of claim 10, further comprising:
    receiving an input from the input device to process the email;
    verifying the input device is valid; and
    processing the email based on the verification.

13. The method of claim 12, further comprising processing the email using a function associated with the requested process upon the input device being valid.

14. The method of claim 13, further comprising associating an encrypted identifier with the email.

15. The method of claim 13, further comprising:
    quarantining the email upon the input device determining the input device is not valid; and
    notifying a user of the quarantined email.

16. An input device for use with a system operable to process an electronic communication comprising:
    means for receiving a request via an input device to process an electronic communication;
    means for determining an identification key operable to identify the input device, the identification key uniquely identifying the input device; and
    means for processing the email using the requested process upon validating the identification key.

17. The input device of claim 16, further comprising:
    means for accessing a portion of memory to determine the identification key;
    means for receiving the identification key from the input device; and
    means for comparing the received identification key to a the stored identification key to determine if the input is valid.

18. The input device of claim 16, further comprising:
    means for receiving a request via a port operably associated with the input device;
    means for receiving the identification key from the input device; and
    means for verifying the request and the identification key.

19. A medium including encoded logic for processing electronic communications comprising the logic operable to:
    determine an input device operably coupled to the system;
    determine if a valid request originated from the input device;
    process the valid request if the input originated at the input device;
    determine an identification key associated with the input device, the identification key uniquely identifying the input device; and
    process an electronic communication upon receiving the valid request from the input device to process the email.

20. The medium as recited in claim 19, further comprising the logic operable to:
  determine a function button operably associated with the input device; and
  receive an input to process the email via a user selecting the function button.

21. The medium as recited in claim 20, further comprising the logic operable to:
  receive an input from the input device to process the email;
  verify the input device is valid; and
  process the electronic communication based on the verification.

22. The medium as recited in claim 20, further comprising the logic operable to process the electronic communication using a function associated with the requested process upon the input device being valid.

* * * * *